United States Patent [19]

Okumura

[11] Patent Number: 4,823,198

[45] Date of Patent: Apr. 18, 1989

[54] VIDEO RECORDING AND REPRODUCING DEVICE AND METHOD INCLUDING VIDEO SIGNAL RECORD RESTART DURING REWIND/PLAYBACK OPERATION AFTER NON-DETECTION OF PILOT SIGNAL IN VIDEO TRACK

[75] Inventor: Nobuyoshi Okumura, Kyoto, Japan

[73] Assignee: Mitsubishi Denki Kabushiki Kaisha, Tokyo, Japan

[21] Appl. No.: 811,351

[22] Filed: Dec. 20, 1985

[30] Foreign Application Priority Data

Dec. 25, 1984 [JP] Japan ............................ 59-278598
May 10, 1985 [JP] Japan ............................ 60-99985

[51] Int. Cl.⁴ .................. H04N 5/782; G11B 15/20
[52] U.S. Cl. ................................. 358/311; 358/312;
360/10.3; 360/14.1; 360/72.3; 360/74.4
[58] Field of Search ............... 358/310, 311, 312, 320,
358/327, 330, 335, 337; 360/10.1-10.3, 14.1,
33.1, 72.1, 72.3, 74.1, 74.4

[56] References Cited

U.S. PATENT DOCUMENTS

| | | | |
|---|---|---|---|
| 3,890,639 | 6/1975 | O'Donnell et al. | 360/14.1 |
| 4,463,391 | 7/1984 | Takano et al. | 360/74.4 X |
| 4,488,185 | 12/1984 | Toba | 360/14.1 |
| 4,604,656 | 8/1986 | Fujii | 360/10.1 |
| 4,638,390 | 1/1987 | Kozuki et al. | 360/74.1 |
| 4,642,704 | 2/1987 | Doutsubo | 360/10.1 X |
| 4,649,439 | 3/1987 | Tanaka | 360/10.1 X |
| 4,680,650 | 7/1987 | Miyazaki et al. | 360/74.1 X |

Primary Examiner—Alan Faber
Assistant Examiner—W. R. Young
Attorney, Agent, or Firm—Staas & Halsey

[57] ABSTRACT

A magnetic recording and reproducing device and method, the device including rotary heads, a pilot signal generating circuit for generating pilot signals different in frequency in synchronization with a change-over signal for the rotary heads. Also included are an adder for superposing the pilot signals on a video signal and applying the resultant signals to the rotary heads, a first switch for stopping the delivery of the pilot signals for a predetermined period of time in a temporary recording stop mode, and a second switch for switching the operation mode of the rotary heads from a recording mode over to a reproducing mode so that, after the first switch has stopped the delivery of the pilot signals, the delivery of signals from the adder is stopped. Further included are a pilot signal extracting circuit for extracting a reproduced pilot signal reproduced from the magnetic tape, and a magnetic tape running control circuit which, after the second switch switches the operation mode of the rotary heads, rewinds the magnetic tape by a predetermined lenght, stops the tape, and controls the running of the tape in the forward direction so that the frequency of the pilot signal from the pilot signal extracting circuit coincides with that of the pilot signal from the pilot signal generating cirucit, in a temporary recording stop removal mode. A pilot signal discriminating circuit is also included for switching the operation mode of the second switch from a reproducing mode over to a recording mode when the level of the pilot signal from the pilot signal extracting cirucit is lower than a predetermined value.

27 Claims, 10 Drawing Sheets

| ACTIVE HEAD | Ch1 | Ch2 | Ch1 | Ch2 | Ch1 | Ch2 |
|---|---|---|---|---|---|---|
| CHANGEOVER SIGNAL | | | | | | |
| PILOT SIGNAL | $f_1$ | $f_2$ | $f_3$ | $f_4$ | $f_1$ | $f_2$ |

VIDEO RECORDING AND REPRODUCING DEVICE AND METHOD INCLUDING VIDEO SIGNAL RECORD RESTART DURING REWIND/PLAYBACK OPERATION AFTER NON-DETECTION OF PILOT SIGNAL IN VIDEO TRACK

BACKGROUND OF THE INVENTION

1. Field of the Invention

The present invention relates to a rotary head type magnetic recording and reproducing device (hereinafter referred to as merely as "a VTR") controlled using control signals superposed on video signals and recorded in video signal tracks on a magnetic tape and, more particularly, to a rotary head type magnetic recording and reproducing device and method in which, when the signal recording operation is temporarily stopped and started again, the recorded patterns are smoothly joined on the magnetic tape, this is, successive picture recording operations are carried out with high accuracy.

2. Description of the Related Art

Heretofore, in order to successively record signals with a VTR, a method has been extremely employed in which a control signal for controlling the forwarding of the magnetic tape is utilized. FIG. 1 illustrates the tape transport system of a VTR in which a control signal recorded on the control track is utilized for controlling the transport of a magnetic tape. The magnetic tape 1 is pushed against the capstan shaft 43 by the pinch roller 44, and is transported by rotation of the capstan shaft 43 past the audio head 6. In a normal recording or reproducing mode, the magnetic tape 1 is supplied from a supply reel 40, wound on drum 42 having a rotary drum video head 24 after passing over tension arm 41 and overall width erasing head 31. After passing over the audio head 6 and the capstan shaft 43, the tape is wound on the take-up reel 46.

FIG. 2 illustrates a recording pattern on a magnetic tape having control tracks in addition to video signal tracks that are formed by a helical scan type VTR. In this case, on the magnetic tape 1, a video signal track 2 is generally recorded obliquely, and control signals 3 are recorded at predetermined intervals in the tape running direction. The control signals 3 are used to control the tape transport operation, that is, the control signals are used to scan the video signal rotary magnetic head 24 over the video tracks 2 accurately during playback. In the following description, a control signal to be recorded on the magnetic tape 1 will be referred to as a "recording control signal", a control signal actually recorded on the magnetic tape will be referred to as a "control signal", and a control signal reproduced from the magnetic tape will be referred to as a "reproduced control signal".

In general, the control signal 3 is formed on the tape by subjecting the vertical synchronizing signal of a video signal to a be recorded to ½ frequency division. The transport of the magnetic tape 1 is controlled so that the time that the control head 6 detects the control signal coincides with the time the video signal rotary magnetic head 25 reaches the start point of the video signal track 2, i.e., the portion where the vertical synchronizing signal is recorded.

If the tape 1 is temporarily stopped during recording, and the tape 1 is run again to immediately restart the recording operation, then on the portion of the tape which corresponds to the joining of the two successive recording operations (hereinafter referred to as the "signal joining portion"), the video signal track 2 varies in recording phase or inclination angle. Accordingly, the picture reproduced from this portion is irregular. When the magnetic tape 1 is temporarily stopped, the locus of the video signal rotary head 24 is as indicated by the broken lines 4 in FIG. 2. To prevent the above-described problem, the following operation is carried out in the servo control system.

When a temporary stop instruction is initiated during picture recording, the picture recording operation is stopped immediately, and the magnetic tape 1 is rewound a predetermined length in the opposite direction. After rewinding, the magnetic tape 1 is stopped and the VTR is ready for the next recording operation.

When the temporary stop instruction is deactivated, the magnetic tape 1 is run in the forward direction. In this situation, the recording operation is not restarted immediately. After the reproduced control signal from the control track of the magnetic tape 1 is synchronized with the vertical synchronizing signal of a new video signal, that is, after the phase of the video signal track recorded previously coincides with that of a new video signal track to be recorded, the recording mode is initiated to restart the recording operation again. In this way, a successive picture recording operation is carried out so that the previously recorded picture is joined smoothly with a new picture to be recorded.

However, the above-described method suffers from a problem when the rotary magnetic head's locus on the magnetic tape, at the time the recording operation is started, the magnetic tape is being transported in the forward direction in the recording mode after removal of the temporary stop instruction, is shifted, in the tape running direction, with respect to the rotary magnetic head's locus on the magnetic tape when the recording operation is stopped by the temporary stop instruction. That is, if the locus is shifted forward on the tape, a new recording pattern overlaps the recording pattern formed on the magnetic tape before removal of the temporary stop instruction. If the locus is shifted backward on the tape, an unrecorded portion or gap is formed on the magnetic tape. During the playback of a magnetic tape recorded using this technique, the reproduced picture is visually unacceptable.

In order to overcome the locus shifting problem, the magnetic tape is run in the reverse direction after the recording operation is stopped when reception of the temporary stop instruction. The number of control signals reproduced from the control track for the period during which the tape is run in the reverse direction are counted and stored. After removal of the temporary stop signal, control signals are reproduced from the control track and counted. The number of control signals thus counted is compared with the number of control signals stored. The recording operation is started when the numbers are equal.

In the above-described conventional VTR, contract between the control head and the magnetic tape is sometimes insufficient when the tape is stopped and then started, or when the tape is run in the reverse direction. Therefore, unless the mechanical accuracy is high, reproduction of the control signals is unreliable during the above-described transition time of the tape running operation. As a result the picture overlap period is increased, or the unrecorded gap is formed. With either result, the reproduced picture is visually unacceptable.

A VTR of the type in which tracking pilot signals are recorded with a rotary head as it performs successive picture recording operations is disclosed in, for example, Japanese patent application Laid-Open No. 203658/1983. That is, upon reception of a temporary stop instruction, the recording operation is temporarily stopped with the recording of signals on a track corresponding to a predetermined pilot signal. Thereafter, similar to the above-described situation, the tape is transported or rewound a predetermined length to be ready for the next recording operation. After removal of the temporary stop instruction, the pilot signal is reproduced to effect tracking servo control. The last recorded track is detected to allow the recording operation to start again from the last track. In order to detect the last track, cross-talk between the pilot signals of adjacent tracks is utilized. However, when the reproducing mode is started after elimination of the temporary stop instruction, the cross-talk cannot be detected for a predetermined period of time. In other words, cross-talk cannot be detected before the tracking servo control is accomplished. Accordingly, it is difficult to detect the last track. A method of detecting the track next to the last track from the presence or absence of the pilot signal in the track is also disclosed. However, the method is disadvantageous in that, even if the recording operation is started again immediately when the last track is detected, an unrecorded gap is formed on the tape.

SUMMARY OF THE INVENTION

In view of the foregoing, an object of the present invention is to provide a rotary head type magnetic recording and reproducing device in which, instead of fixed heads such as audio heads, rotary heads are employed to carry out successive picture recording using pilot signals.

It is another object of the present invention to provide successive picture recording without signal overlap or signal gaps.

It is a further object of the present invention to provide a different frequency pilot signal on each track to increase the ease of detecting the pilot signal and control tracking.

The above objects of the present invention can be achieved by a magnetic recording and reproducing device and method which uses an adder for superposing a tracking pilot signal on a video signal and a rotary head for recording an output signal of the adder in video tracks on a magnetic tape and reproducing the output signal thus recorded. In addition, switching means is included for stopping the delivery of the pilot signal and stopping the recording operation beginning with the video track next to the video track on which the pilot signal has been stopped when in a temporary recording stop mode. A pilot signal discriminating circuit is also included for detecting the video track on which the pilot signal has been stopped, and starting a recording operation beginning with the video track next to the video track on which the pilot signal has been stopped when in a temporary recording stop removal mode.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
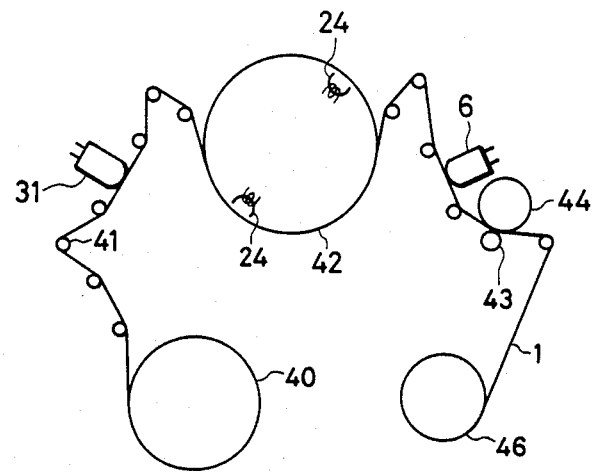
FIG. 1 is an explanatory diagram outlining the arrangement of a magnetic tape running system in a general VTR.
Figure 2:
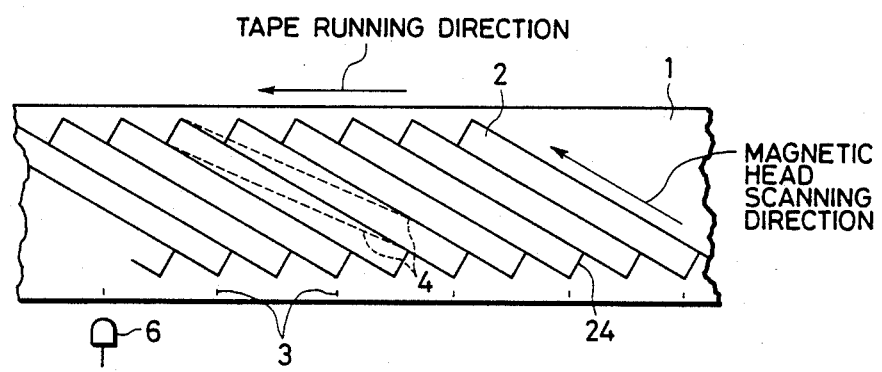
FIG. 2 is a diagram illustrating relationships between a recorded pattern on a magnetic tape in a successive picture recording operation and a locus described on the magnetic tape by the rotary magnetic head in a conventional VTR.
Figure 3:
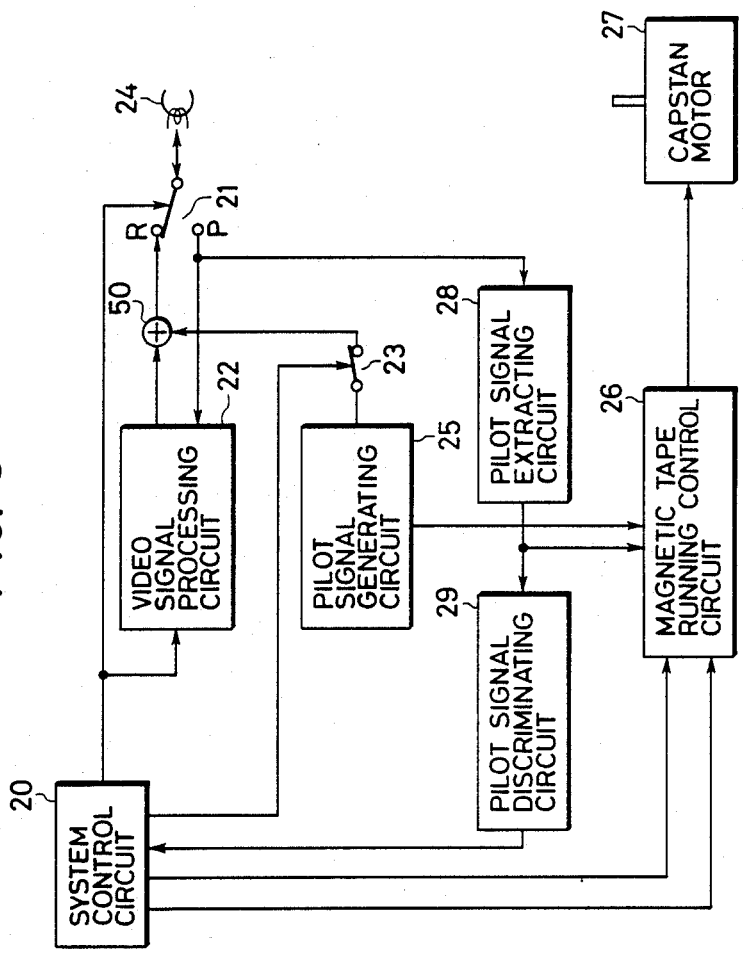
FIG. 3 is a block diagram of a preferred embodiment of a VTR of the present invention.
Figure 4:
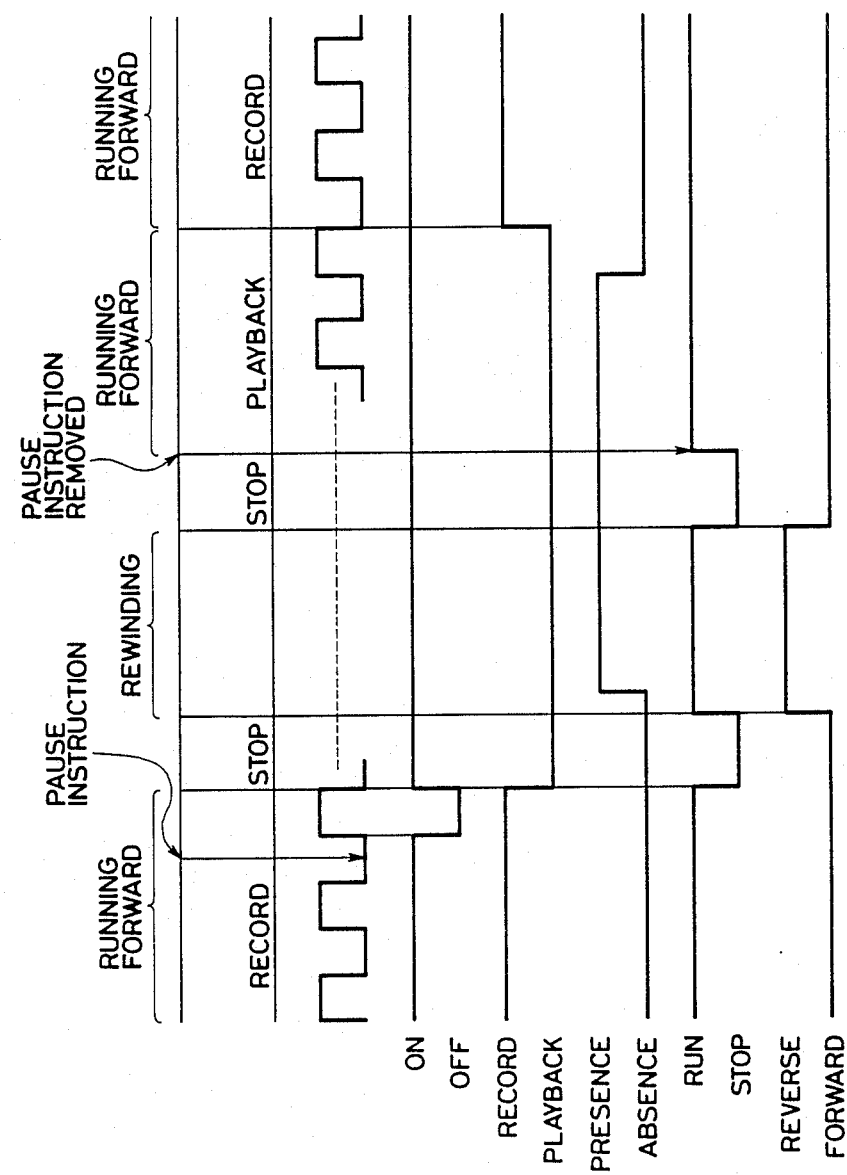
FIGS. 4A–4F are collectively a timing chart for the operation of the VTR shown in FIG. 3.

FIG. 3 is a block diagram showning a VTR which is a first preferred embodiment of the present invention. For purposes of providing an example and providing an easily understandable explanation, in the following explanation of the preferred embodiment, the number of tracks for recording only video signals before suspension of the recording operation is only one. However, the present invention applies to multiple tracks as well.

A system control circuit 20 produces control signals B through F shown respectively as FIGS. 4(B) through 4(F). The control signals provide the timing for operation of the present invention during recording, stopping, rewinding, forward transport and restarting of the recording as illustrated in FIGS. 4(A) through 4(F) in response to a temporary stop command and its release.

A video signal processing circuit 22 (FIG. 3) converts a video signal into a frequency modulated signal which is combined or superposed by adder 50 with a pilot signal from a pilot signal generating circuit 25 and applied to magnetic heads 24. The pilot signal output is controlled by switch 23 and is a plurality of pilot signals of different frequency generated in synchronization with the change over or rotation of magnetic heads 24. Thus, the pilot signal is used for tracking control. During the recording operation, switch 21 is in the record position R and during playback it is in the playback position P. During playback the reproduced signal is applied to a pilot signal extraction circuit 28 whch removes the pilot signal. The presence or absence of the pilot signal is detected by a pilot signal discriminating circuit 29 and the system control 20 circuit is notified. A magnetic tape transport control circuit 26 controls a capstan motor 27 during the forward, stop and rewind operations.

Figure 6:
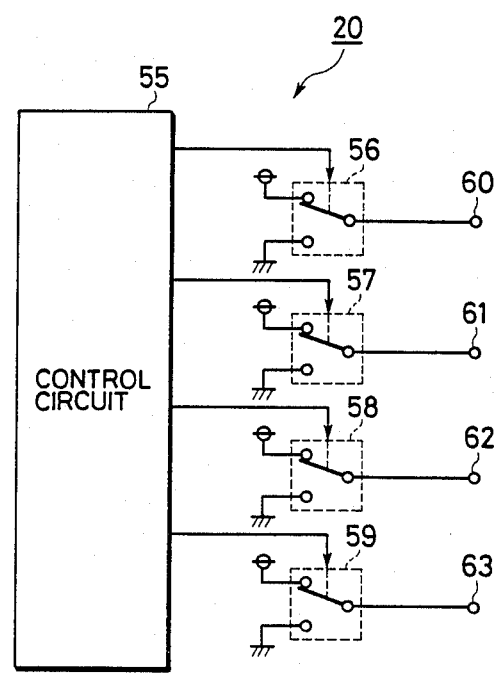
FIG. 6 is a block diagram of one example of a system control circuit 20 in the VTR of FIG. 3.

FIG. 6 illustrates one example of the system control circuit. A microcomputer type control circuit 55, such as an M50742-657FP CPU by Mitsubishi of Japan, controls switching circuits 56-59 to provide high and low voltage levels to output terminals 60-63, as illustrated in FIGS. 4(B) through 4(F). The program necessary to control the microcomputer 50 based on the temporary stop command, the recording restart command and the detection signal D to produce the control signals of FIG. 4 can be provided by one of ordinary skil in the art from the timing charts and circuit diagrams herein.

In response to a control signal from the control circuit 55, the change-over circuit 56 selects the high voltage level during a recording operation, and the low voltage level during a reproducing operation or when the magnetic tape is stopped, thus providing control signal C at the output terminal 60. Similarly, the change-over circuit 57 selects the high voltage level when the tape is running, and the low voltage level when the tape is stopped, thus providing control signal E at the output terminal 61. The change-over circuit 58 selects the high voltage level when the tape is transported in the reverse direction, and the low voltage level when the tape is transported in the forward direction or stopped, thus providing control signal F at the output terminal 62. The change-over circuit 59 selects the low voltage level when the tape is temporarily stopped, and the high voltage level when not temporarily stopped, thus providing control signal B at the output terminal 63.

Figure 7A:
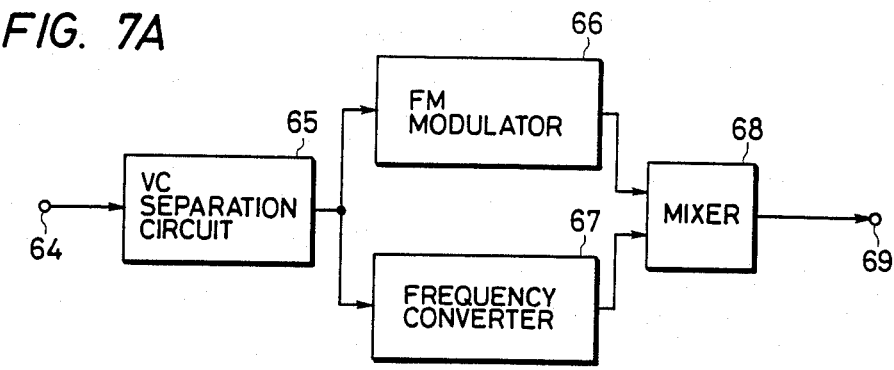
FIGS. 7A and 7B are block diagrams of one example of video signal processing circuit 22 in the VTR of FIG. 3.
Figure 7B:
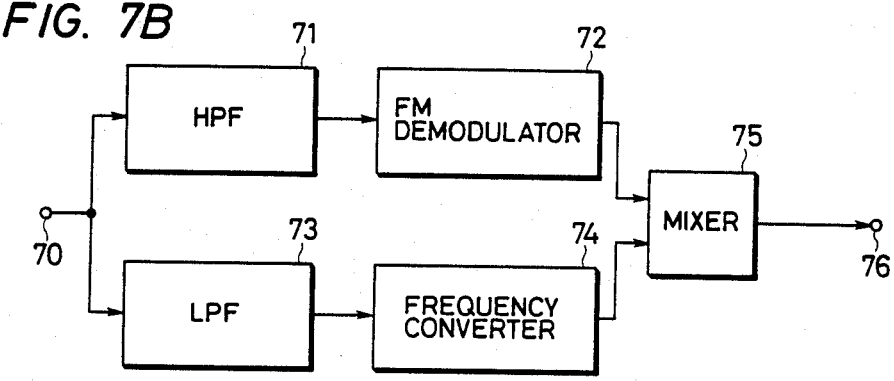

FIGS. 7A and 7B shown on example of the video signal processing circuit 22 of FIG. 3. During a recording operation, a video signal applied to the input terminal 64 (FIG. 7A) is divided into a luminance (Y) signal and a color (C) signal by a YC separation circuit 65. The luminance signal is frequency-modulated by an FM modulator 66 and the color signal is applied to the frequency converter 67. The output of the frequency converter 67 is superposed on the frequency-modulated luminance signal by mixer 68, and is applied to the output terminal 69 which is connected to switch 23 of FIG. 3.

During a reproducing operation, a reproduced signal applied to the input terminal 70 (FIG. 7B), from switch 21 of FIG. 3, is applied to a high pass filter 71, wherein the frequency-modulated luminance signal is extracted. The extracted frequency-modulated luminance signal is demodulated by an FM demodulator 72. The output of the frequency converter is superposed on the luminance signal in a mixer 75, and the output is provided as a video signal at output terminal 76.

Figure 8:
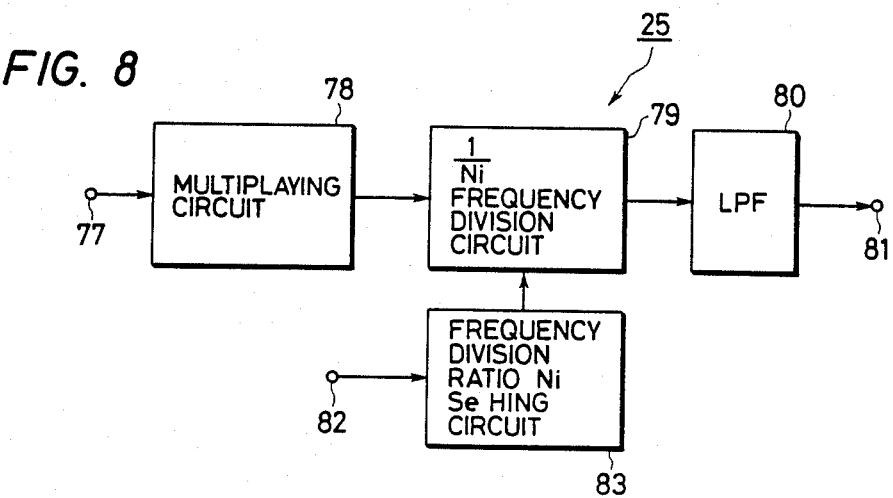
FIG. 8 is a block diagram of one example of a pilot signal generating circuit 25 in the VTR of FIG. 3.

FIG. 8 illustrates one example of the pilot signal generating circuit 25 of FIG. 3. A horizontal synchronizing signal is applied through an input terminal 77 to a 375 multiplying circuit 75 where it is subjected to multiplication. The horizontal synchronizing signal is extracted from the reproduced video signal upon reproducing or the recorded video signal upon recording. The output of the multiplying circuit 75 is subjected to a 1/Ni frequency division in a 1/Ni frequency division circuit 79. The frequency division ratio Ni is set by a frequency division ratio Ni setting circuit 83 in accordance with a pilot signal selecting signal from terminal 82. An example of the relationship between the pilot signal and the frequency division ratio is as follow: In a the NTSC system, $N_1=58$, $N_2=50$, $N_3=36$ and $N_4=40$ respectively for $f_1=102.5$ KHz, $f_2=119.0$ KHz, $f_3=165.2$ KHz and $f_4=148.5$ KHz. The pilot signal selecting signal is a combination signal a high level signal and a low level signal. The pilot signals $f_1$ to $f_4$ are designated by the four combinations of signals. Each combination signal is obtained from two input signals, one being a head change-over signal (described later) and the other being a signal obtained by subjecting the head change-over signal to ½ frequency division in a ½ frequency division circuit such as an RS flip-flop circuit. The output of the 1/Ni frequency division circuit 79 is applied to a low-pass filter 80 where signals higher in frequency than the second harmonic component are removed from the output. The output of the lowpass filter 80 is provided at the output terminal 81.

Figure 9:
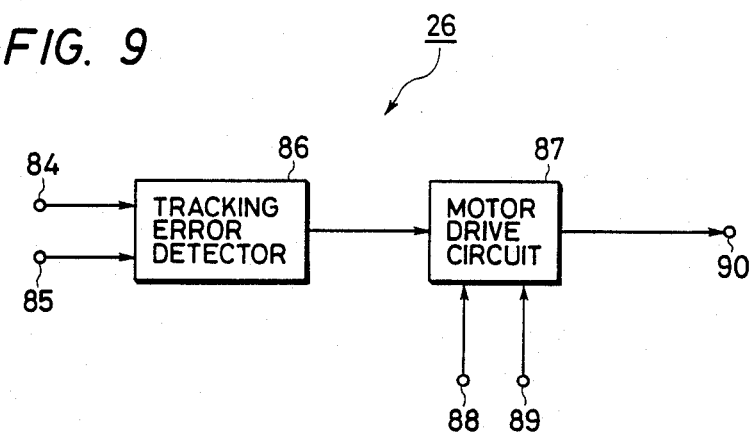
FIG. 9 is a block diagram of one example of a magnetic tape running control circuit 26 in the VTR of FIG. 3.

FIG. 9 shows one example of the magnetic tape running control circuit 26 of FIG. 3. A reference pilot signal from the pilot signal generating circuit 25 and a reproduced pilot signal from the pilot signal extraction circuit 28 are applied through input terminals 84 and 85 and utilized to detect the amount of tracking error by a tracking error detecting circuit 86. A speed instruction is applied to a motor drive circuit 87, according to the amount of tracking error thus detected. In response to the speed instruction and control signals E and F provided at input terminals 88 and 89 by the system control circuit 20, the motor drive circuit 87 provides motor drive output signals at output terminal 90 to control the speed, rotation or stopping, and the forward rotation of reverse rotation of the capstan motor 27.

Figure 10:
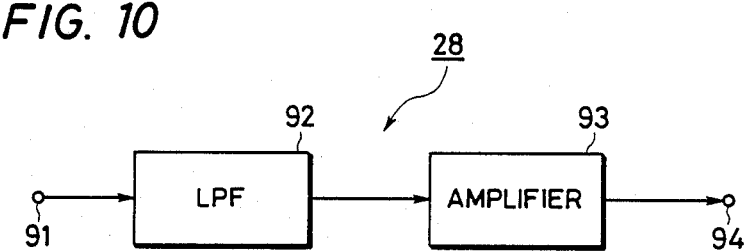
FIG. 10 is a block diagram of one example of a pilot signal extracting circuit 28 in the VTR of FIG. 3.

FIG. 10 shows one example of the pilot signal extracting circuit 28 of FIG. 3. A low-pass filter 92 operates to extract a pilot signal from a reproduced signal input through input terminal 91. The output of the low-pass filter 92, after being amplified by an amplifier, is then provided at output terminal 94.

Figure 11:
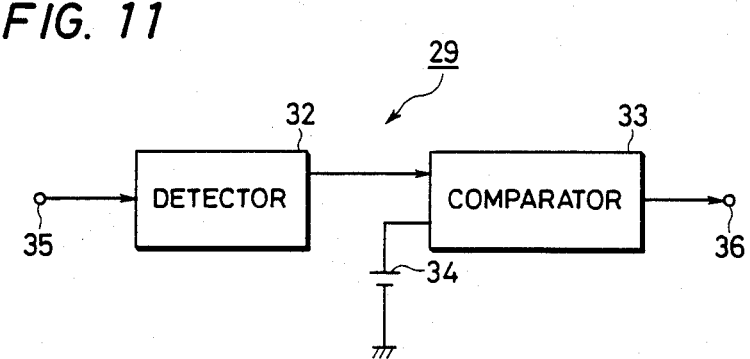
FIG. 11 is a block diagram of one example of a pilot signal circuit 29 in the VTR of FIG. 3.

FIG. 11 shows one example of the pilot signal discriminating circuit 29 of FIG. 3. A reproduced video signal is input from switch 21 (FIG. 3) through terminal 35 to an envelope detector 32. The output of detector 32 is applied to a comparator 33 which compares the detected signal to a DC source 34 voltage value. When the detected signal matches, a pilot signal detection signal is supplied to the system control circuit 20 through terminal 36.

Figures 12A, 12B:
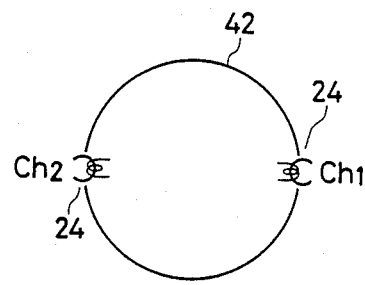
FIGS. 12A and 12B are diagrams illustrating relationships between a rotary head change-over signal and a pilot signal.

FIGS. 12A and 12B show the relationships between the active state of rotary heads 24, the head change-over signal, and the frequency of the pilot signal. This relationship is used to produce the pilot signal selecting signal. In both FIGS. 12A and 12B, reference character CH1 designates one of the rotary heads 24, and CH2, the other rotary head 24. While the head CH1 helically scans the magnetic tape, the head change-over signal A is at a high voltage level; while the other head Ch2 helically scans the magnetic tape, the head change-over signal A is at a low voltage level. The frequency of the pilot signal is cyclically changed to frequencies $f_1$, $f_2$, $f_3$ and $f_4$ in synchronization with the head change-over signal A.

Returning to FIG. 4 which is a timing chart for the present invention, the operation of the present invention will be described. During a normal recording operation, the system control circuit 20 applies the control signal C to the second switch 21 and the video signal processing circuit 22 so that the switch 21 and the processing circuit 22 are placed in a recording mode. The system control circuit 20 also supplies the control signal B to the first switch 23 to turn it on. As a result, the signal obtained by superposing the pilot signal on the frequency-modulated video signal is recorded on the magnetic tape using the rotary magnetic head 24. The system control circuit 20 also supplies the control signals E and F to the magnetic tape running control circuit 26 to control the capstand motor 27 to run in the forward direction at a predetermined speed.

Figure 5:
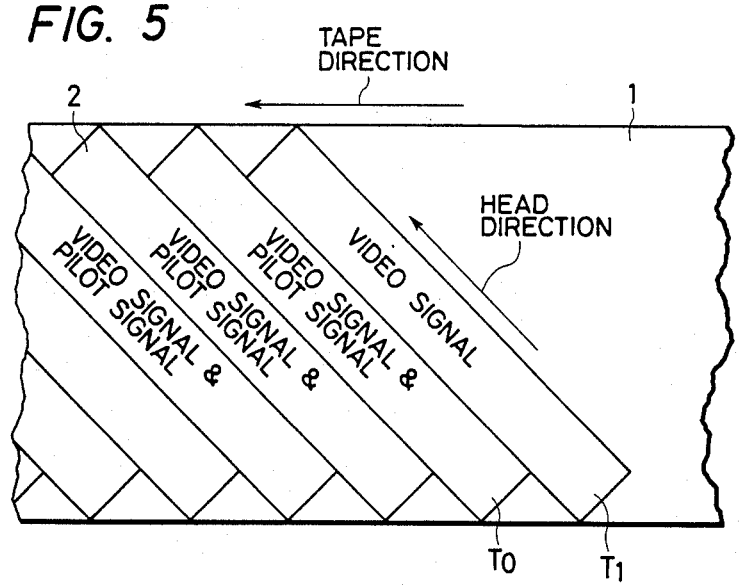
FIG. 5 is a diagram of a recorded pattern which exists on the magnetic tape immediately before the magnetic tape is temporarily stopped in a successive picture recording operation.

When, in this situation, the temporary stop instruction is applied to the control circuit 20, the control signal B from the system control circuit 20 turns off the first switch 23 in synchronization with the head change-over signal A for one track period. Thereafter, the control signal C from the system control circuit 20 changes the second switch 21 to the playback position P, so that the recording of the video signal and the pilot signal on the magnetic tape is suspended. In this situation, the recording tracks are as shown in FIG. 5, where numeral 1 designates the magnetic tape and numeral 2 the video signal tracks. As is apparent from FIG. 5, during the ordinary recording operation, the video signal and the pilot signal are both recorded on the video signal track 2. However, if the temporary stop instruction is provided while the track $T_0$ is being recorded, then because of the above-described action of the system control circuit, no pilot signal is recorded in the next track $T_1$; that is, only the video signal is recorded, and the recording is suspended.

After recording is suspended as described above, in response to the control signal E from the system control circuit 20 the magnetic tape running control circuit 26 stops the capstan motor 27. The capstan motor 27 is then turned in the opposite direction, so that the magnetic tape 1 is stopped after being run in the reverse direction for a predetermined period of time.

When the temporary stop instruction is eliminated, the control signals E and F from the system control circuit 20 cause the magnetic tape to run in the forward direction. When the system control circuit 20 applies the control signal C to the second switch 20 and the video signal processing circuit 22, the switch 20 and the circuit 22 operate in a reproducing or playback mode. In the pilot signal extracting circuit 28, to which the reproduced signal is applied, the reproduced pilot signal is extracted. In the magnetic tape running control circuit 26, the reproduced pilot signal is utilized to control the capstan motor 27 in such a manner that the locus of the rotary magnetic head 24 described on the magnetic tape coincides with the recorded pattern on the magnetic tape which has been recorded before the application of the temporary stop instruction. At this point, the frequency of the pilot signal generated by the pilot signal generating circuit coincides with that of the pilot signal recorded on the track which is scanned by the rotary magnetic head 24, thus controlling the tape running operation. The predetermined period of time for running the magnetic tape in the reverse direction after the application of the temporary stop instruction is determined so that, when the magnetic tape running operation is started again the magnetic tape running control is carried out according to the reproduced pilot signal, the control system can be sufficiently stabilized within that predetermined period of time.

The reproduced pilot signal extracted by the pilot signal extracting circuit 28 is applied, as a tracking control signal, to the magnetic tape running control circuit 26 as was described above, and is further applied to the pilot signal discriminating circuit 29. That is, the reproduced pilot signal is applied to the input terminal 35 of the discriminating circuit 29 (FIG. 11) and is subjected to envelope detection in the detector circuit 32. The output of the detector circuit 32 is supplied to the comparator 33, where it is compared with a predetermined potential provided by DC source 34. When the output of the detector circuit 32 is higher than the potential of the DC source 34, a high voltage level signal is provided at the output terminal 36. When the output of the detector circuit 32 is lower than the potential of DC source 34, a low voltage level signal is provided at the output terminal 36. Accordingly, when the rotary magnetic head scans the magnetic tape as shown in FIG. 5, a reproduced pilot signal having a certain level is obtained from the track in which the video signal and the pilot signal have been recorded, and the pilot signal discriminating circuit 29 provides the high voltage level output. In contrast, when the rotary magnetic head scans the track $T_1$ in which only the video signal is recorded (no pilot signal), the reproduced pilot signal is at a very low level because only the cross-talk from the adjacent track $T_0$ is available. As a result, the output of the pilot signal discriminating circuit 29 is set to the low voltage level. This output D of the discriminating circuit 29 is supplied to the system control circuit 20.

In the system control circuit 20, upon reception of the signal D representing the detected absence of a reproduced pilot signal, in synchronization with the head change-over signal A, the control signal C is changed over to that for the recording mode beginning with the next track. With the aid of this control signal C, the recording of the video signal and the pilot signal on the magnetic tape is started again.

Figure 13:
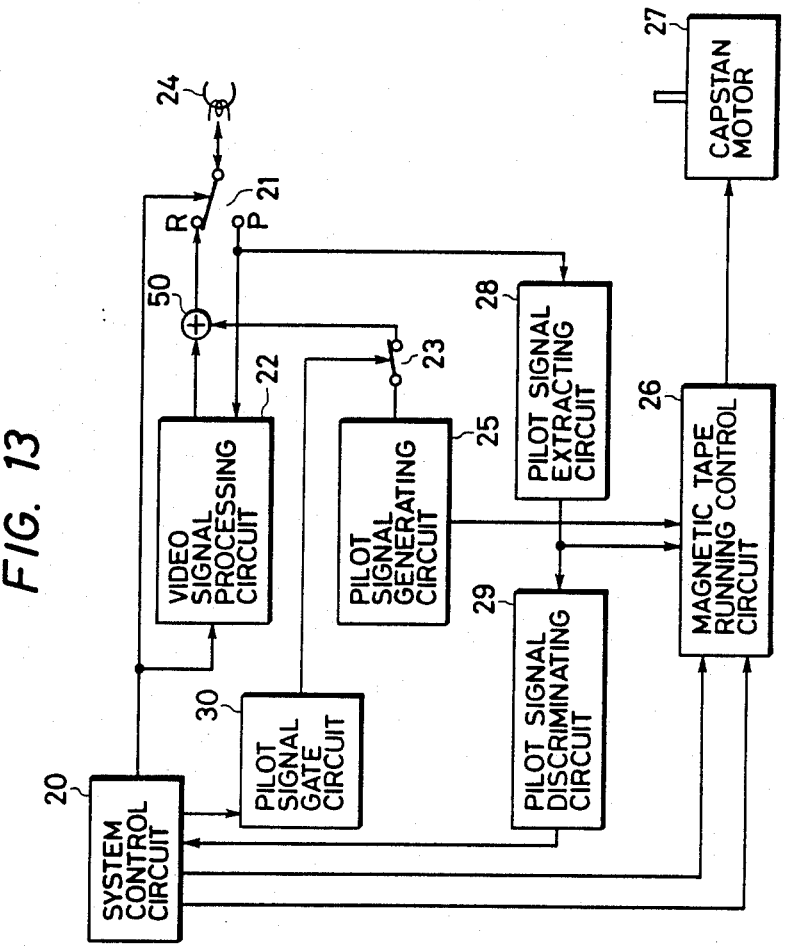
FIG. 13 is a block diagram of another preferred embodiment of a VTR of the invention.
Figure 16:
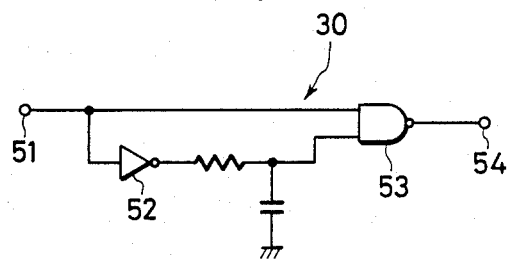
FIG. 16 is a block diagram showing one example of a pilot signal gate circuit 30 in the VTR of FIG. 13.
Figure 17A:
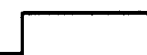
FIGS. 17A–17D are collectively a timing chart for a description of the operation of the pilot signal gate circuit 30 shown in FIG. 16.
Figure 17B:
Figure 17C:
Figure 17D:

FIG. 13 illustrates a VTR, which is a second embodiment of the present invention. The VTR in FIG. 13 can be obtained by adding a pilot signal gate circuit 30 to the VTR in FIG. 3. One example of the pilot signal gate circuit 30 is as shown in Fig. 16. In order to allow the system control circuit 20 to drive the pilot signal gate circuit 30, the change-over circuit 59 in FIG. 6 selects the high voltage level during other situations, thus providing a control signal G at its output terminal 63. The operation of the pilot signal gate circuit 30 will now be described with reference to the timing chart shown in FIGS. 17(A) through 17(D). When a temporary stop instruction signal G, whose rising edge represents a temporary stop, is applied to the input terminal 51 in FIG. 16, an inverter 52 outputs a signal H which is obtained by inverting the instruciton signal G. A discharge output signal I is obtained with a time constant determined by a resistance R and a capacitance C. As a result, a 2-input NAND data 53 produces an output signal B. Thus, the output signal B is held at a low voltage level for a predetermined period after the application of the temporary stop instruction signal G.

Figure 14:
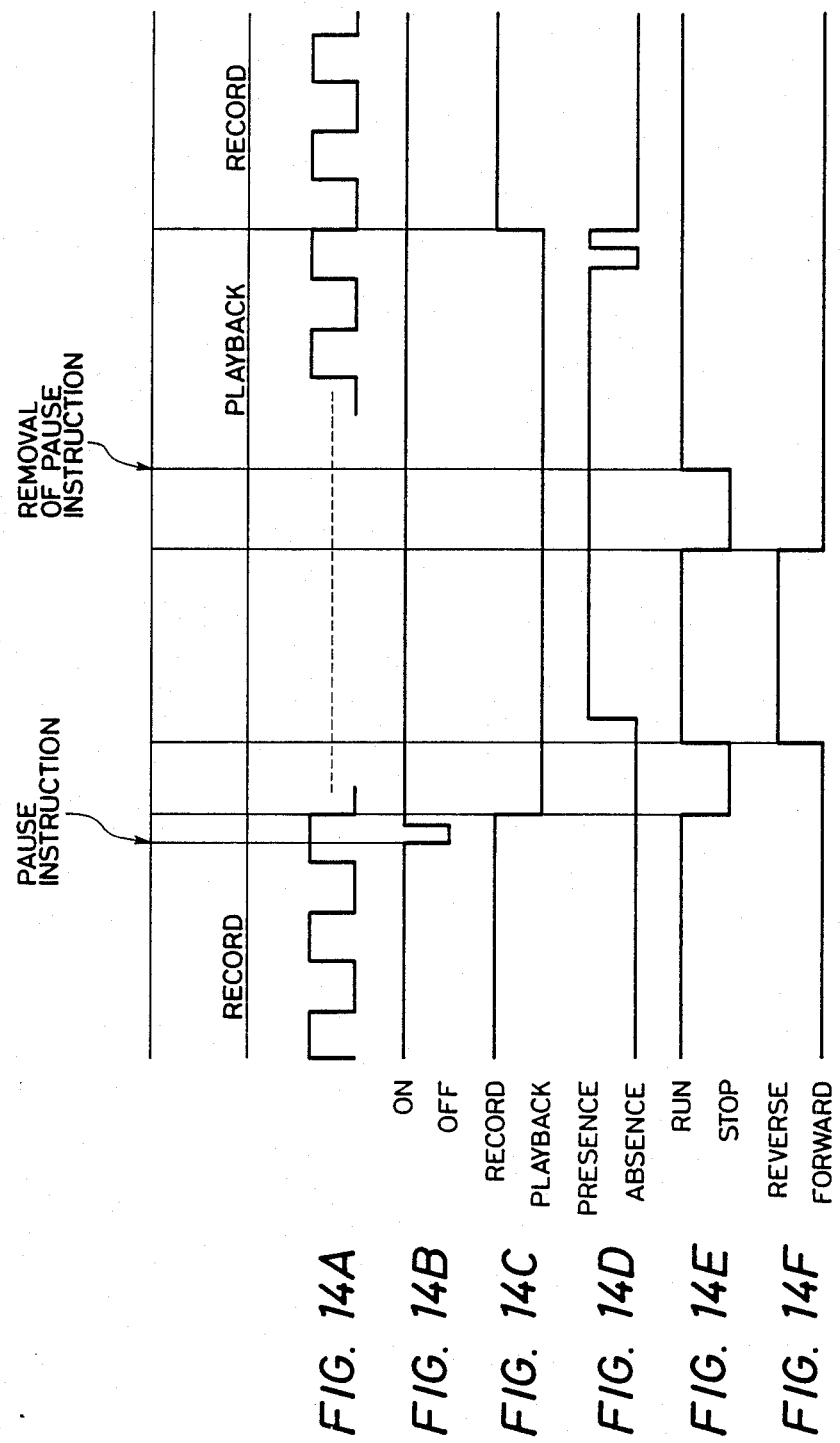
FIGS. 14A–14F is a timing chart for the operation of the VTR shown in FIG. 13.

The operation of the VTR of FIG. 13 will now be described with refernce to the timing chart of FIG. 14. In a normal recording operation, the system control circuit 20 applies the control signal C to the second switch 21 and the video signal processing circuit 22 so that the switch 21 and the circuit 22 operate in a recording mode. The system control circuit 20 also supplies the control signal B to the first switch 23 to turn it on. As a result, the signal obtained by superposing the pilot signal on the frequency-modulated video signal is recorded on the magnetic tape using the rotary magnetic head 24. The system control circuit 20 also applies the control signals E and F to the magnetic tape running control circuit 26 to control the capstan motor 27 so that the magnetic tape is run in the forward direction at a predetermined speed.

Figure 15:
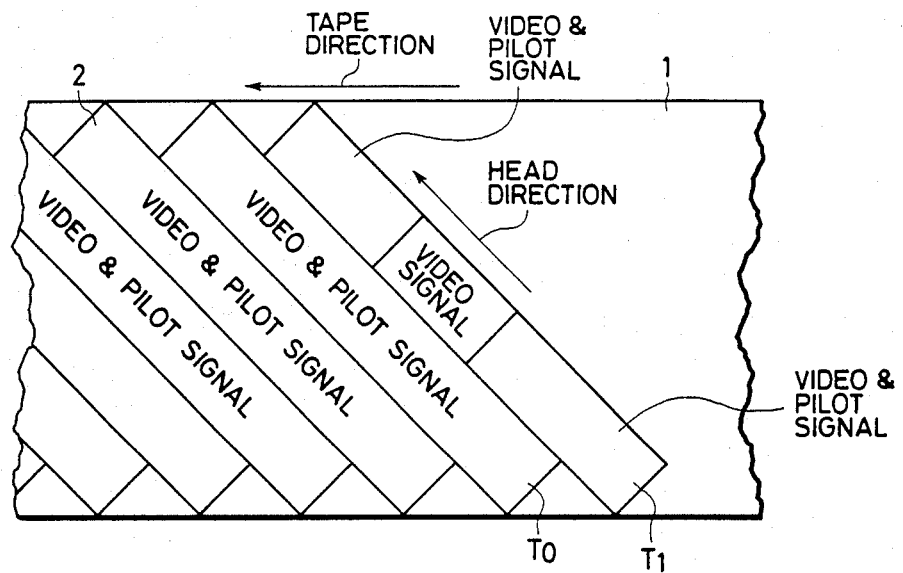
FIG. 15 is a diagram of a recorded pattern which exits on the magnetic tape immediately before the magnetic tape is temporarily stopped in a successive picture recording operation.

When the temporary stop instruction is provided, the control signal B from the system control circuit 20 turns off the first switch 23 for a predetermined period. Thereafter, the control signal C from the system control circuit 20, which is synchronized with the head changeover signal A, operates the second switch 21 so that recording of the video signal and the pilot signal on the magnetic tape is suspended. The resulting recording tracks are shown in FIG. 15, where reference numeral 1 designates the magnetic tape and 2 the video signal tracks. As is apparent from FIG. 15, during normal recording operations, the video signal and the pilot signal are both recorded on the video signal track 2. However, if the temporary stop instruction is provided while the track $T_1$ is being recorded, then because of the above-described actions of the system control circuit 20 and the pilot signal gate circuit 30, only the video signal is recorded in a part of the track $T_1$. The pilot signal is not recorded). After the recording of the track $T_1$ has been completed, the recording operation is suspended.

Similarly, as in the case of the VTR in FIG. 3, after the recording operation is suspended as described above, the temporary stop instruction is removed, and the recording operation is resumed again.

As is apparent from the VTR described above, after the temporary stop is eliminated, the recording operation is started again beginning with the video signal track next to the last video signal track which has been recorded before elimination of the temporary stop. Therefore, neither a recorded pattern overlap portion nor an unrecorded gap is formed on the magnetic tape when the tape is temporarily stopped, and restarted. No pilot signal is recorded in the last video signal track to be recorded before the magnetic tape is stopped. During there is no negative reproducing operation, the effect on the tape running control system during actual use due to the fact that the pilot signal does not exist on the aforementioned last track. Accordingly, playback of the magnetic tape having a signal joining portion produces a high quality picture which is free from the visual distortion associated with overlap portions and/or unrecorded gaps.

The VTR of the present invention, unlike conventional ones, does not need a stationary head for reproducing the control signal. This makes it possible to simplify the arrangement of the VTR.

In the above-described embodiments, one track scanning period or less is the period of time during which no pilot signal is recorded before suspension of the recording operation. However, it is possible to make the period greater than one track scanning period, in which case the same results as described above can be obtained.

The many features and advantages of the invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A video recording and reproducing device for a magnetic tape using rotary magnetic heads, said device comprising:

recording means for recording, during a recording operation, a plurality of video signals and pilot signals, each pilot signal being different in frequency from one another in video tracks on a magnetic tape, each pilot signal being sequentially different in frequency according to the order of the video tracks, the pilot signals being superposed on the video signals;

switching means, operable during a temporary recording stop mode, for providing only video signals for recording on the video tracks such that a last video track with a video signal but without a pilot signal is produced, and for ending the recording operation by said recording means after recording the last video track;

magnetic tape running control means for rewinding the magnetic tape a predetermined length from the last video track and for stopping said magnetic tape, said control means including means for reproducing, during a temporary recording stop removal mode, the pilot signals for tracking of the magnetic tape running operation; and means for detecting, during the temporary recording stop removal mode, the last video track and for starting a successive recording operation of said recording means at a video track after the last video track.

2. A device as recited in claim 1, wherein the video tracks are arranged obliquely and adjacent to one another in a magnetic tape transport direction and said recording means comprises:

a video signal processing circuit for frequency modulating a luminance component and low frequency converting a color component of an input signal forming a video signal for recording on a magnetic tape;

a pilot signal generating circuit for cyclically generating the plurality of pilot signals each different in frequency and in synchronization with a changeover signal for the rotary magnetic heads;

an adder, operatively connected to said video signal processing circuit and said pilot signal generating circuit, for adding the video signals and the pilot signals to produce a combined output signal; and at least one rotary magnetic head, operatively connected to said adder, for recording the output signal from said adder in the video tracks.

3. A device as recited in claim 1, further comprising a system control circuit for outputting control signals to the control means and an operational mode changeover signal for the rotary magnetic heads, and wherein said switching means comprises:

a first switch, operatively connected to the rotary magnetic heads and operable in response to a system control signal, for switching said pilot signals for a predetermined period of time out of said recording means during said temporary recording stop mode; and a second switch, operatively connected to the rotary magnetic heads and operable in response to another system control signal, for switching the recording operation of said recording means over a reproducing operation after said predetermined period of time.

4. A device as recited in claim 3, wherein said first switch switches out the pilot signals for only one video track period in synchronization with the change-over signal for the rotary magnetic heads.

5. A device as recited in claim 3, wherein said first switch includes a pilot signal gate circuit, for turning off said first switch at a predetermined period of time which is less than one video track period during said temporary stop mode.

6. A device as recited in claim 5, wherein said second switch switches the recording operation to the reproducing operation in synchronization with the change-over signal of the rotary magnetic heads after said first switch has switched out the pilot signals.

7. A device as recited in claim 2, wherein said magnetic tape running control means comprises:

a pilot signal extracting circuit, operatively connected to the rotary magnetic heads, for extracting the pilot signal recorded on the magnetic tape; and a magnetic tape running control circuit, operatively connected to said pilot signal extracting circuit and to the pilot signal generating circuit, for controlling the transport of the magnetic tape in a forward direction by pilot signal tracking and for rewinding the magnetic tape a predetermined length so that the frequency of said recorded pilot signal coincides with that of the pilot signals generated by the pilot signal generating circuit in said temporary recording stop removal mode.

8. A device as recited in claim 1, wherein said detecting means includes a pilot signal discriminating circuit, operatively connected to said rotary magnetic heads, for detecting a level of the pilot signals on the magnetic tape, to determine the presence or absence of the pilot signals.

9. A video recording and reproducing device for video signals, comprising:

rotary heads for recording and reproducing video signals in video tracks which are arranged obliquely and adjacent to one another in a magnetic tape running direction and having a change over signal associated therewith;

a pilot signal generating circuit for cyclically generating a plurality of pilot signals each different in frequency and being in synchronization with a change-over signal;

an adder, receiving the video signals and connected to said pilot signal generating circut, for superposing the pilot signals generated on the video signals and applying the resultant signals to said rotary heads;

a first switch, connected between said pilot signal generating circuit and said adder, for switching said pilot signals out of a line from said pilot signal generating circuit to said adder for a predetermined period of time in a temporary recording stop mode;

a second switch, connected between said adder and said rotary heads, for switching the operation mode of said rotary heads from a recording mode to a reproducing mode and for switching the resultant signals out of said rotary heads after switching out the pilot signals;

a system control circuit for outputting control signals to the first and second switches;

a pilot signal extracting circuit, operatively connected to said second switch, for extracting a reproducing pilot signal recorded on the magnetic tape;

a magnetic tape running control circuit, operatively connected to said pilot signal generating circuit and said pilot signal extracting circuit, for, after said second switch switches the operation mode of said plurality of rotary heads, rewinding said magnetic tape a predetermined length and stopping said magnetic tape, and controlling the running of the magnetic tape in the forward direction by pilot signal tracking causing the frequency of the reproduced pilot signal to coincide with that of the pilot signal generated by the pilot signal generating circuit in the temporary recording stop removal mode; and a pilot signal discriminating circuit, operatively connected to said pilot signal extracting circuit and said second switch, for switching the operation mode of said second switch from the reproducing mode to the recording mode when the level of the reproduced pilot signal is lower than a predetermined level.

10. A device as recited in claim 9, wherein said first switch switches out the pilot signals for only one video track period in synchronization with the change-over signal of said rotary heads.

11. A device as recited in claim 10, wherein said second switch switches the operation mode of said rotary heads from the reproducing mode to the recording mode and vice versa in synchronization with a change-over signal of said rotary heads.

12. A device as recited in claim 9, wherein said first switch switches out the pilot signals for a predetermined period of time less than one video track period.

13. A device as recited in claim 12, wherein said second switch switches the operation mode of said rotary heads from the reproducing mode to the recording mode and vice versa in synchronization with a change-over signal of said rotary heads.

14. A device as recited in claim 9, wherein said pilot signal generating circuit comprises:

a multiplier for multiplying the frequency of a horizontal synchronizing signal in the video signal;

a frequency divider, connected to said multiplier and said adder, for frequency-dividing an output signal of said mutliplier according to frequency division ratios; and a ratio setting unit, connected to said frequency divider, for sequentially setting the frequency division ratios.

15. A device as recited in claim 14, wherein said pilot signal extracting circuit includes a filter, connected to said second switch, for extracting a pilot signal from the reproduced video signal.

16. A device as recited in claim 9, wherein said device further includes a capstan motor and said magnetic tape running control circuit comprises:
   a tracking error detecting circuit, connected to said pilot singal generating circuit and said pilot signal extracting circuit, for subjecting the pilot signal and the reproduced pilot signal to a comparison to detect a tracking error; and
   a motor drive circuit, connected to said tracking error detecting circuit, for controlling speed, stopping, forward rotation and reverse rotation of the capstan motor adapted to drive the magnetic tape, according to the tracking error, and the temporary recording stop mode and the temporary recording sto removal mode.

17. A device as recited in claim 9, wherein said pilot signal discriminating circuit comprises:
   a detector circuit, connected to said pilot signal extracting circuit, for detecting the reproduced pilot signal extracted from the video signal and producing an output; and
   a comparison circuit, connected to said detector circuit and said second switch, for comparing the level of the output of said detector circuit with a predetermined level.

18. A video recording and reproducing device, comprising:
   an adder for superposing a tracking pilot signal on a video signal and producing an output signal;
   a rotary head, operatively connected to said adder, for recording the output signal in video tracks on a magnetic tape and reproducing the recorded output signal;
   switching means, operatively connected to said adder and said rotary head, for stopping the recording of the tracking pilot signal at the end of a first video track and stopping a recording operation by said rotary head at the end of a second video track adjacent the first video track, the plate signal, being unrecorded on the second track, in a temporary recording stop mode; and
   a pilot signal discriminating circuit, operatively connected to said rotary head, for detecting the second video track and starting a recording operation again beginning after the second video track, in a temporary recording stop removal mode.

19. A device as recited in claim 18, further comprising:
   a magnetic tape running control circuit including means for rewinding the magnetic tape a predetermined length from the first video track and stopping the magnetic tape in the temporary recording stop mode, means for producing a pilot signal and for reproducing the tracking pilot signal which has been recorded and means for applying pilot signal tracking servo control to the running of the magnetic tape during the temporary recording stop removal mode.

20. A device as recited in claim 18, wherein said switchign means comprises:
   a first switch, connected to said adder, for switching the pilot signal out of a line to the adder for a predetermined time period; and
   a second switch, connected to said rotary head and said adder, for switching the operation mode of said rotary head from a reproducing mode to a recording mode and for switching the output signal out of said adder after said predetermined time period.

21. A device as recited in claim 20, wherein said second switch is operatively connected to said pilot signal discriminating circuit which produces an output signal and switches the operation mode of said rotary head from the reproducing mode to the recording mode responsive to an output signal of said pilot signal discriminating circuit.

22. A device as recited in claim 21, wherein said pilot signal discriminating circuit comprises:
   a detector circuit, connected to said rotary head, for reproducing the tracking pilot signal by envelope detection and producing an output signal; and
   a comparison circuit, connected to said detector circuit, for comparing the output signal from said detector circuit with a predetermined level.

23. A video recording and reproducing device for a magnetic tape and having rotary magnetic heads in recording and pick-up proximity to the magnetic tape, comprising:
   a drive motor for transporting the magnetic tape;
   control means, operatively connected to said rotary magnetic heads and said drive motor, for providing a combined video and pilot signal to said rotary magnetic heads during a recording operation while causing the drive motor to transport the tape in a forward direction until a temporary stop mode is initiated, for providing only a video signal to said rotary magnetic heads during continuation of said recording operation while the tape is transported in said forward direction, for causing the drive motor to stop the transport of the tape and to rewind the tape for a predetermined time while in the temporary stop mode, for detecting the pilot signal, and for causing the drive motor to transport the tape in the forward direction and providing a combined video and pilot signal to said rotary magnetic heads during a recording operation when a pilot signal is not detected when in a temporary stop removal mode.

24. A device as recited in claim 23, wherein said control means comprises:
   means for providing control signals;
   video signal processing means for providing a video signal;
   pilot signal generation means for providing a pilot signal;
   pilot signal interruption means for interrupting the pilot signal in dependence on one of the control signals;
   adding means for adding the video signal and the pilot signal when the pilot signal is not interrupted and for providing the video signal when the pilot signal is interrupted;
   switching means for interrupting the video signal to the rotary magnetic heads after the pilot signal is interrupted in dependence on one of the control signals and providing a reproduced signal form the rotary magnetic heads;
   pilot signal extraction means for extracting a reproduced pilot signal from the reproduced signal;
   pilot signal detection means for detecting the reproduced pilot signal and notifying said control means; and
   motor control means for controlling said drive motor in dependence on some of the control signals, the pilot signal and the reproduced pilot signal.

25. A video recording and reproducing method, comprisng the steps of:
 (a) recording a combined video and pilot signal on a magnetic tape during a normal mode;
 (b) recording, during a temporary stop mode, the combined video and pilot signal on at least one track and recording only the video signal on at least one successive track;
 (c) stopping the magnetic tape after the successive track is recorded;
 (d) rewinding the magnetic tape a predetermined distance;
 (e) moving the magnetic tape in a forward direction, reproducing the first and second tracks and detecting the second track in a return-to-normal mode; and
 (f) recording a combined video and pilot signal after the second track is detected.

26. A method as recited in claim 25, wherein the second track is detected by detecting the absence of the pilot signal.

27. A method as recited in claim 25, wherin at least two magnetic heads are used in alternation and the pilot signal is a different frequency for each alternation.

* * * * *

UNITED STATES PATENT AND TRADEMARK OFFICE
CERTIFICATE OF CORRECTION

PATENT NO. : 4,823,198

DATED : April 18, 1989

INVENTOR(S) : OKUMURA

It is certified that error appears in the above-identified patent and that said Letters Patent is hereby corrected as shown below:

Title page:

ABSTRACT:

Line 20, "lenght" should be --length--;
Line 24, "cirucit" should be --circuit--;
Line 29, "cirucit" should be --circuit--.

COLUMN 1:

Line 25, "extremely" should be --extensively--;
Line 59, delete "a"; and after "to" (second occurrence) insert --a--.

COLUMN 4:

Line 43, "exits" should be --exists--.

COLUMN 5:

Line 50, delete "shown on" and insert --show one--.

COLUMN 6:

Line 16, delete "the";
Line 20, delete "combination signal a";
Line 68, "CH1" should be --Ch1--; and "CH2" should be --Ch2--.

COLUMN 7:

Line 1, "CH1" should be --Ch1--.

UNITED STATES PATENT AND TRADEMARK OFFICE
CERTIFICATE OF CORRECTION

PATENT NO. : 4,823,198

DATED : April 18, 1989

INVENTOR(S) : OKUMURA

Page 2 of 2

It is certified that error appears in the above-identified patent and that said Letters Patent is hereby corrected as shown below:

COLUMN 8:

Line 65, "instruciton" should be --instruction--.

COLUMN 9:

Line 5, "refernce" should be --reference--;
Line 54, delete "there is no negative reproducing operation" and insert --reproducing operation there is no negative--.

COLUMN 13:

Line 5, delete "singal" and insert --signal--;
Line 15, delete "sto" and insert --stop--;
Line 61, delete "switchign" and insert --switching--.

COLUMN 15:

Line 2, delete "prisng" and insert --prising--.

Signed and Sealed this

Ninth Day of January, 1990

Attest:

JEFFREY M. SAMUELS

Attesting Officer     Acting Commissioner of Patents and Trademarks